Figure 3:
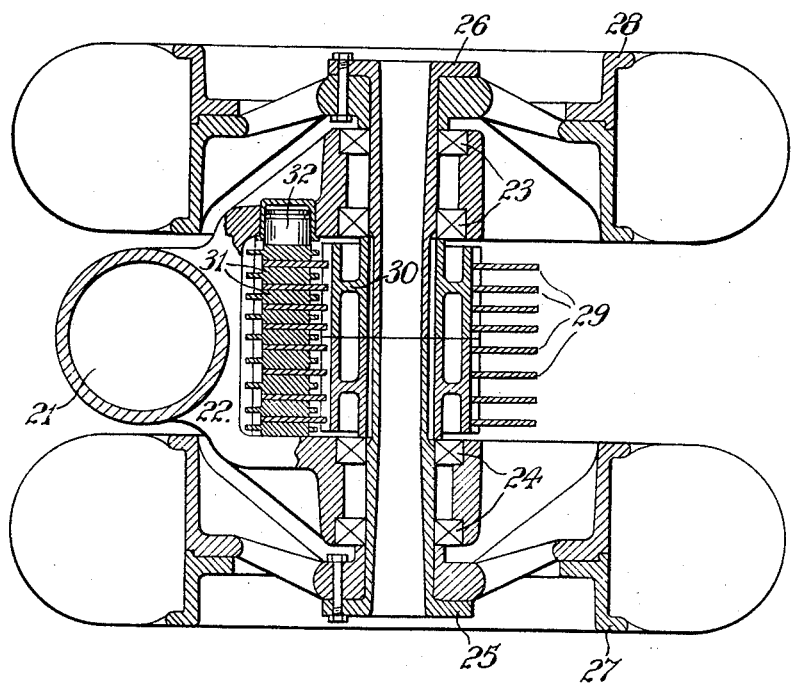

May 29, 1951          H. J. BUTLER          2,555,182
AIRPLANE WHEEL BRAKE
Filed April 16, 1948          2 Sheets-Sheet 1
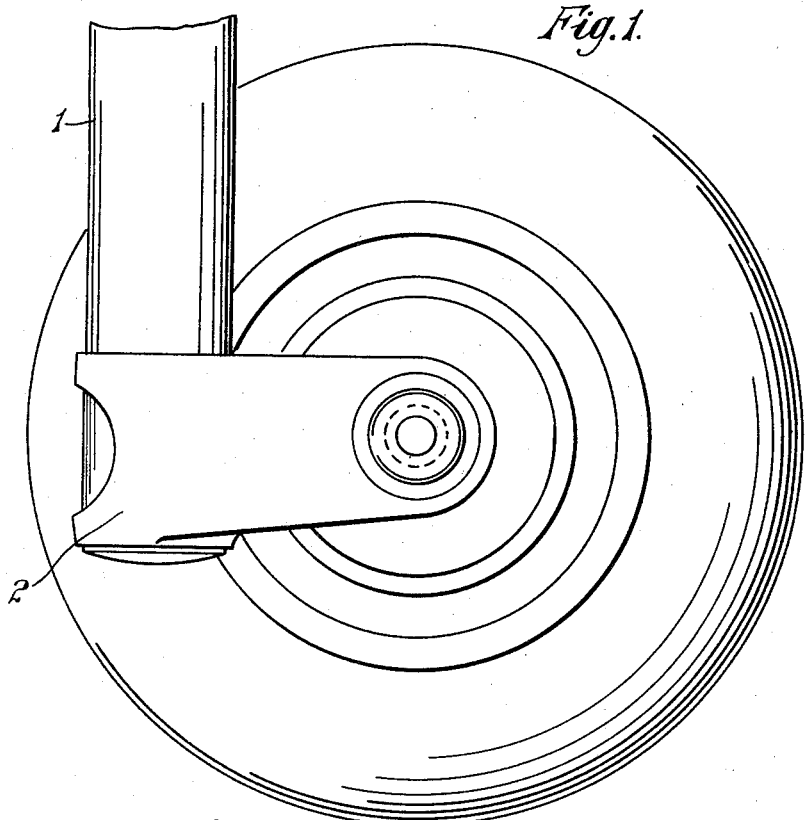
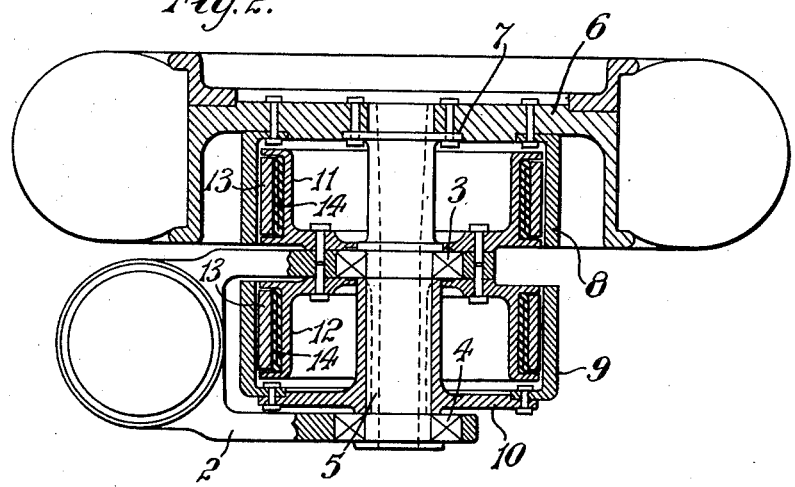
INVENTOR
Henry James Butler
by Benj. T. Rauber
his attorney Patented May 29, 1951

2,555,182

UNITED STATES PATENT OFFICE 2,555,182

AIRPLANE WHEEL BRAKE

Henry James Butler, Sutton Coldfield, England, assignor to Dunlop Rubber Company Limited, London, England, a British company Application April 16, 1948, Serial No. 21,497
In Great Britain April 23, 1947

2 Claims. (Cl. 188—18)

This invention relates to aeroplane braking systems.

In an aeroplane the landing wheels are usually connected to the fuselage by the legs of an oleo-pneumatic shock-absorbing device and braking is effected by brake drums or brake discs connected to the wheel in association with friction blocks connected to the oleo leg. Increase in the landing speed of aeroplanes has intensified the problem of supplying them with adequate braking capacity, a problem not made easier by the increasing size and weight of certain types of aircraft. The problem is further intensified by the present day trend to reducing the diameter of landing wheels which thereby restricts the space in the wheel into which the braking unit can be fitted and prevents any substantial increase in the size of the present type of brake unit.

It is an object of the present invention to provide increased braking capacity in an aeroplane without increasing the diameter of the land wheels.

According to the invention a braking system for aeroplanes comprises a wheel, an axle fixed thereto rotatable in a bearing on a fixed part of the aeroplane and extending beyond the said bearing, brake apparatus associated with the wheel and a fixed part of the aeroplane, and additional brake apparatus associated with the extension of the axle and a fixed part of the aeroplane.

Preferably the axle is carried in bearings mounted on a bifurcated arm projecting from an undercarriage leg, and the brake apparatus is mounted between the bifurcations.

The invention will now be more particularly described with reference to the accompanying drawings wherein:

Figures 1 and 2 show a side elevation and a cross-section plan respectively of one embodiment of the invention and Figure 3 is a cross-sectional plan view of another embodiment of the invention.

Referring to Figures 1 and 2, a leg 1 of an oleo-pneumatic shock-absorbing device is provided with an arm 2 substantially at right angles thereto. The arm is bifurcated and is provided at its ends with roller bearings 3 and 4 in which are rotatably mounted an axle 5. A wheel 6 is bolted to a flanged portion 7 of the axle and a brake drum 8 is bolted to the wheel body. A second brake drum 9 is bolted to a flanged sleeve 10 fixed to the axle, and annular channel-shape members 11 and 12 are bolted to one of the bifurcations. Brake shoes 13 and distensible bags 14 are located in these channels.

Referring now to Figure 3, a bifurcated arm 22 is fixed to the bottom of a shock-absorber leg 21 and carries roller bearings 23 and 24 within which are rotatably mounted the two portions 25 and 26 of an axle. Wheels 27 and 28 are bolted to the axle.

The brake mechanism which, in this case, is of the disc type, is mounted between the bifurcated arms and comprises discs 29 which are mounted in a disc carrier 30 keyed to the axle and are capable of axial displacement with respect to the carrier.

Between the discs are mounted friction pads 31 which are operated by fluid pressure admitted behind a piston 32.

Having described my invention what I claim is:

1. A braking system for aircraft which comprises a supporting leg branched at its lower end to a pair of spaced branches, an axle journaled in and projecting beyond said branches, a wheel secured to the projecting part of the axle, brake mechanism on the part of the axle between the branches and additional brake mechanism on the projecting part of the axle.

2. A braking system according to claim 1 wherein each brake mechanism comprises a surface rotatable with said axle and a surface fixed on a branch of said leg and a fluid expansible element to bring said surfaces into frictional engagement.

HENRY JAMES BUTLER.

REFERENCES CITED

The following references are of record in the file of this patent:

UNITED STATES PATENTS

| Number | Name | Date |
|---|---|---|
| 344,530 | Howe | June 29, 1886 |
| 2,174,397 | Farmer et al. | Sept. 26, 1939 |
| 2,199,785 | Dickson | May 7, 1940 |
| 2,267,560 | Farmer | Dec. 23, 1941 |
| 2,287,969 | Brown | June 30, 1942 |
| 2,356,942 | Mills | Aug. 29, 1944 |
| 2,401,364 | Mercier | June 4, 1946 |